United States Patent
Ranta et al.

(10) Patent No.: US 9,813,958 B2
(45) Date of Patent: Nov. 7, 2017

(54) METHOD AND APPARATUS FOR PACKET TUNNELING

(71) Applicant: AVAGO TECHNOLOGIES GENERAL IP (SINGAPORE) PTE. LTD., Singapore (SG)

(72) Inventors: Jukka Tapio Ranta, Kaarina (FI); Kaisu Maria Iisakkila, Espoo (FI); Samuli Turtinen, Li (FI); Sami-Jukka Hakola, Kempele (FI); Timo Kalevi Koskela, Oulu (FI)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 320 days.

(21) Appl. No.: 14/439,488

(22) PCT Filed: Oct. 25, 2013

(86) PCT No.: PCT/IB2013/059666
§ 371 (c)(1),
(2) Date: Apr. 29, 2015

(87) PCT Pub. No.: WO2014/068464
PCT Pub. Date: May 8, 2014

(65) Prior Publication Data
US 2015/0289312 A1    Oct. 8, 2015

(30) Foreign Application Priority Data
Oct. 30, 2012 (GB) .................................. 1219486.6

(51) Int. Cl.
*H04W 36/02* (2009.01)
*H04W 88/06* (2009.01)
(Continued)

(52) U.S. Cl.
CPC ............. *H04W 36/02* (2013.01); *H04L 69/22* (2013.01); *H04L 69/324* (2013.01);
(Continued)

(58) Field of Classification Search
CPC ..... H04W 36/30; H04W 36/02; H04W 88/06; H04W 76/043; H04L 65/1083; H04L 69/324; H04L 69/22
See application file for complete search history.

(56) References Cited

U.S. PATENT DOCUMENTS 9,445,446 B2 * 9/2016 Wei ...................... H04W 76/023
2010/0260096 A1 * 10/2010 Ulupinar ............... H04B 7/2606
370/315

(Continued)

FOREIGN PATENT DOCUMENTS

WO    WO 2013/185528 A1    12/2013

OTHER PUBLICATIONS

International Search Report dated Jun. 12, 2014 in PCT/IB2013/059666 filed Oct. 25, 2013.
(Continued)

*Primary Examiner* — Redentor Pasia
(74) *Attorney, Agent, or Firm* — Oblon, McClelland, Maier & Neustadt, L.L.P.

(57) ABSTRACT

A method, apparatus and computer program product are provided herein for enabling a D2D bearer to stay alive even in an instance in which a D2D connection is lost. In some example embodiments, a method is provided that comprises detecting a condition that indicates that a device-to-device bearer is to be terminated. The method of this embodiment may also include modifying a cellular bearer protocol data unit header, such that the cellular bearer protocol data unit header indicates that a cellular bearer service data unit is a device-to-device protocol data unit. The method of this
(Continued)

embodiment may also include causing one or more device-to-device protocol data units to be encapsulated within one or more cellular bearer protocol data units, such that the one or more device-to-device protocol data units are transmitted via a cellular bearer.

20 Claims, 7 Drawing Sheets

(51) Int. Cl.
    *H04L 29/06*     (2006.01)
    *H04L 29/08*     (2006.01)
    *H04W 76/04*     (2009.01)
    *H04W 36/30*     (2009.01)

(52) U.S. Cl.
    CPC ......... *H04W 76/043* (2013.01); *H04W 88/06* (2013.01); *H04L 65/1083* (2013.01); *H04W 36/30* (2013.01)

(56) References Cited

U.S. PATENT DOCUMENTS

| | | | |
|---|---|---|---|
| 2010/0260097 A1 | 10/2010 | Ulupinar et al. | |
| 2010/0260126 A1 | 10/2010 | Ulupinar et al. | |
| 2010/0279672 A1* | 11/2010 | Koskela | H04W 36/30 455/418 |
| 2013/0254277 A1* | 9/2013 | Vasudevan | H04W 76/023 709/204 |
| 2013/0272196 A1* | 10/2013 | Li | H04W 72/044 370/328 |
| 2014/0003262 A1* | 1/2014 | He | H04W 28/08 370/252 |
| 2014/0016542 A1 | 1/2014 | Ulupinar et al. | |
| 2014/0071950 A1* | 3/2014 | Jang | H04W 36/30 370/331 |
| 2014/0160950 A1* | 6/2014 | Vasudevan | H04W 36/00 370/252 |
| 2014/0213221 A1* | 7/2014 | Chai | H04W 76/023 455/411 |
| 2015/0023267 A1* | 1/2015 | Lim | H04L 1/1854 370/329 |
| 2015/0036495 A1* | 2/2015 | Venkatachalam | H04W 28/0215 370/235 |
| 2015/0195863 A1* | 7/2015 | Reznik | H04W 76/027 370/228 |
| 2017/0094561 A1* | 3/2017 | Horneman | H04W 28/12 |

OTHER PUBLICATIONS

Klaus Doppler, et al., "Device-to-Device communications; functional prospects for LTE-Advanced networks", Communications Workshops, XP031515460, Jun. 14, 2009, 6 Pages.

"3rd Generation Partnership Project; Technical Specification Group Radio Access Network; Evolved Universal Terrestrial Radio Access (E-UTRA); Packet Data Convergence Protocol (PDCP) specification (Release 11)", 3GPP Standard; 3GPP TS 36.323, vol. 11.0.0, XP050649757, Sep. 21, 2012, 27 Pages.

\* cited by examiner

METHOD AND APPARATUS FOR PACKET TUNNELING

CROSS REFERENCE TO RELATED APPLICATION

This application claims the benefit under 35 U.S.C. §119(a) and 37 CFR §1.55 to UK patent application no. GB 1219486.6, filed on Oct. 30, 2012, the entire content of which is incorporated herein by reference.

TECHNICAL FIELD

Embodiments of the present invention relate generally to communications technology and, more particularly, to example packet tunneling.

BACKGROUND

The modern computing era has brought about a tremendous expansion in computing power as well as increased affordability of computing devices. This expansion in computing power has led to a reduction in the size of computing devices and given rise to a new generation of mobile devices that are capable of performing functionality that only a few years ago required processing power provided only by the most advanced desktop computers. Consequently, mobile computing devices having a small form factor have become ubiquitous and are used by consumers of all socioeconomic backgrounds.

As a result of the expansion in computing power and the reduction in size of mobile computing devices, mobile computing devices are being marketed with an ever increasing array of features. For example, one such feature is the ability for mobile terminals to communicate via device-to-device (D2D) connections.

A D2D connection is operable to enable a mobile terminal to be in direct data communication with another mobile terminal, via the cellular spectrum, without using the one or more base stations within a cellular network. The use of D2D connections enables the transfer of data between mobile terminals over a short distance while avoiding the potential of overloading the cellular network. In future long term evolution (LTE) networks, D2D communications and local switching are to be supported.

SUMMARY

In some example embodiments, a method is provided that comprises detecting a condition that indicates that a device-to-device bearer is to be terminated. The method of this embodiment also includes modifying a cellular bearer protocol data unit header, such that the cellular bearer protocol data unit header indicates that a cellular bearer service data unit is a device-to-device protocol data unit. The method of this embodiment also includes causing one or more device-to-device protocol data units to be encapsulated within one or more cellular bearer protocol data units, such that the one or more device-to-device protocol data units are transmitted via a cellular bearer.

In further example embodiments, an apparatus is provided that includes a processing system that may be embodied by at least one processor and at least one memory including computer program code. The processing system is arranged to cause the apparatus to at least detect a condition that indicates that a device-to-device bearer is to be terminated. The processing system is also arranged to cause the apparatus to modify a cellular bearer protocol data unit header, such that the cellular bearer protocol data unit header indicates that a cellular bearer service data unit is a device-to-device protocol data unit, and to cause the apparatus to cause one or more device-to-device protocol data units to be encapsulated within one or more cellular bearer protocol data units, such that the one or more device-to-device protocol data units are transmitted via a cellular bearer.

In yet further example embodiments, a computer program product may be provided that includes at least one non-transitory computer-readable storage medium having computer-readable program instructions stored therein with the computer-readable program instructions including program instructions configured to detect a condition that indicates that a device-to-device bearer is to be terminated. The computer-readable program instructions also include program instructions configured to modify a cellular bearer protocol data unit header, such that the cellular bearer protocol data unit header indicates that a cellular bearer service data unit is a device-to-device protocol data unit. The computer-readable program instructions also include program instructions configured to cause one or more device-to-device protocol data units to be encapsulated within one or more cellular bearer protocol data units, such that the one or more device-to-device protocol data units are transmitted via a cellular bearer.

In yet further example embodiments, an apparatus is provided that includes means for detecting a condition that indicates that a device-to-device bearer is to be terminated. The apparatus of this embodiment may also include means for modifying a cellular bearer protocol data unit header, such that the cellular bearer protocol data unit header indicates that a cellular bearer service data unit is a device-to-device protocol data unit. The apparatus of this embodiment may also include means for causing one or more device-to-device protocol data units to be encapsulated within one or more cellular bearer protocol data units, such that the one or more device-to-device protocol data units are transmitted via a cellular bearer.

In some example embodiments, a method is provided that comprises receiving a cellular bearer protocol data unit header. In some example embodiments, the cellular bearer protocol data unit header is configured to indicate that a service data unit of a cellular bearer protocol data unit is an encapsulated device-to-device protocol data unit. The method of this embodiment also includes decoding the cellular bearer protocol data unit header to determine a destination of the encapsulated device-to-device protocol data unit. The method of this embodiment also includes causing the encapsulated device-to-device protocol data unit to be routed to a receiving mobile terminal.

In further example embodiments, an apparatus is provided that includes a processing system that may be embodied as at least one processor and at least one memory including computer program code. The processing system is arranged to cause the apparatus to at least receive a cellular bearer protocol data unit header. In some example embodiments, the cellular bearer protocol data unit header is configured to indicate that a service data unit of a cellular bearer protocol data unit is an encapsulated device-to-device protocol data unit. The processing system is also arranged to cause the apparatus to decode the cellular bearer protocol data unit header to determine a destination of the encapsulated device-to-device protocol data unit, and to cause the apparatus to cause the encapsulated device-to-device protocol data unit to be routed to a receiving mobile terminal.

In yet further example embodiments, a computer program product may be provided that includes at least one non-transitory computer-readable storage medium having computer-readable program instructions stored therein with the computer-readable program instructions including program instructions configured to receive a cellular bearer protocol data unit header. In some example embodiments, the cellular bearer protocol data unit header is configured to indicate that a service data unit of a cellular bearer protocol data unit is an encapsulated device-to-device protocol data unit. The computer-readable program instructions also include program instructions configured to decode the cellular bearer protocol data unit header to determine a destination of the encapsulated device-to-device protocol data unit. The computer-readable program instructions also include program instructions configured to cause the encapsulated device-to-device protocol data unit to be routed to a receiving mobile terminal.

In yet further example embodiments, an apparatus is provided that includes means for receiving a cellular bearer protocol data unit header. In some example embodiments, the cellular bearer protocol data unit header is configured to indicate that a service data unit of a cellular bearer protocol data unit is an encapsulated device-to-device protocol data unit. The apparatus of this embodiment may also include means for decoding the cellular bearer protocol data unit header to determine a destination of the encapsulated device-to-device protocol data unit. The apparatus of this embodiment may also include means for causing the encapsulated device-to-device protocol data unit to be routed to a receiving mobile terminal.

In some example embodiments, a method is provided that comprises receiving an indication that a device-to-device bearer is to be terminated. The method of this embodiment also includes receiving one or more device-to-device protocol data units via a cellular bearer. In some example embodiments, a cellular bearer protocol data unit header of the one or more cellular protocol data units indicates that a cellular bearer service data unit is a device-to-device protocol data unit. The method of this embodiment also includes decoding the one or more device-to-device protocol data units using a packet data convergence protocol entity associated with the device-to-device bearer.

In further example embodiments, an apparatus is provided that includes a processing system that may be embodied as at least one processor and at least one memory including computer program code. The processing system is arranged to cause the apparatus to at least receive an indication that a device-to-device bearer is to be terminated. The processing system is arranged to cause the apparatus to receive one or more device-to-device protocol data units via a cellular bearer. In some example embodiments, a cellular bearer protocol data unit header of the one or more cellular protocol data units indicates that a cellular bearer service data unit is a device-to-device protocol data unit. The processing system is additionally arranged to cause the apparatus to decode the one or more device-to-device protocol data units using a packet data convergence protocol entity associated with the device-to-device bearer.

In yet further example embodiments, a computer program product may be provided that includes at least one non-transitory computer-readable storage medium having computer-readable program instructions stored therein with the computer-readable program instructions including program instructions configured to receive an indication that a device-to-device bearer is to be terminated and to receive one or more device-to-device protocol data units via a cellular bearer. In some example embodiments, a cellular bearer protocol data unit header of the one or more cellular protocol data units indicates that a cellular bearer service data unit is a device-to-device protocol data unit. The computer-readable program instructions also include program instructions configured to decode the one or more device-to-device protocol data units using a packet data convergence protocol entity associated with the device-to-device bearer.

In yet further example embodiments, an apparatus is provided that includes means for receiving an indication that a device-to-device bearer is to be terminated. The apparatus of this embodiment may also include means for receiving one or more device-to-device protocol data units via a cellular bearer. In some example embodiments, a cellular bearer protocol data unit header of the one or more cellular protocol data units indicates that a cellular bearer service data unit is a device-to-device protocol data unit. The apparatus of this embodiment may also include means for decoding the one or more device-to-device protocol data units using a packet data convergence protocol entity associated with the device-to-device bearer.

BRIEF DESCRIPTION OF THE DRAWINGS

Figure 1:
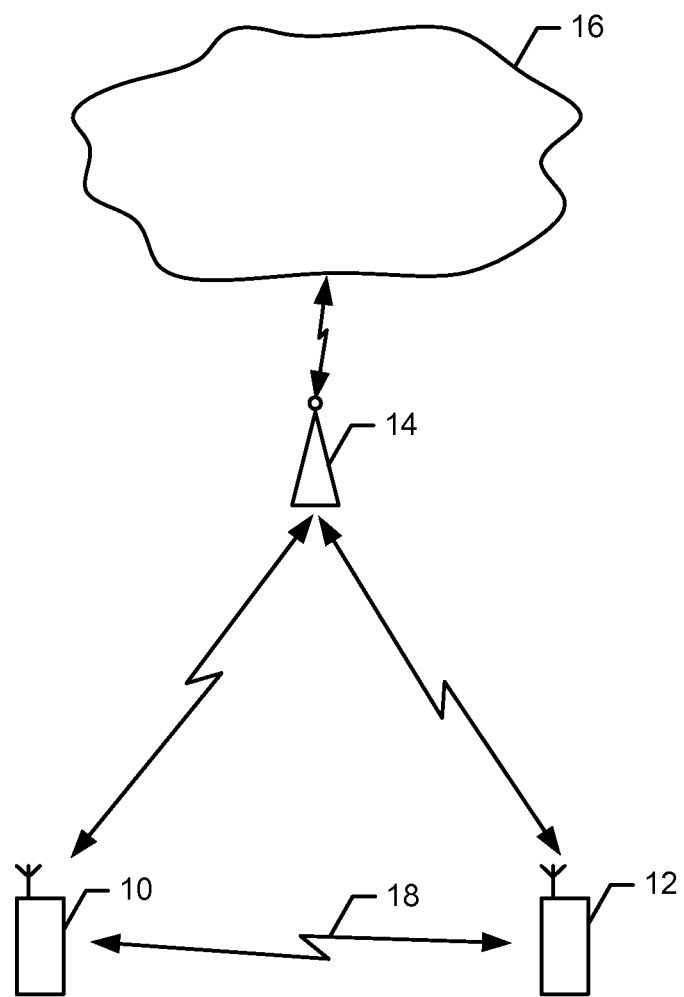
Figure 2:
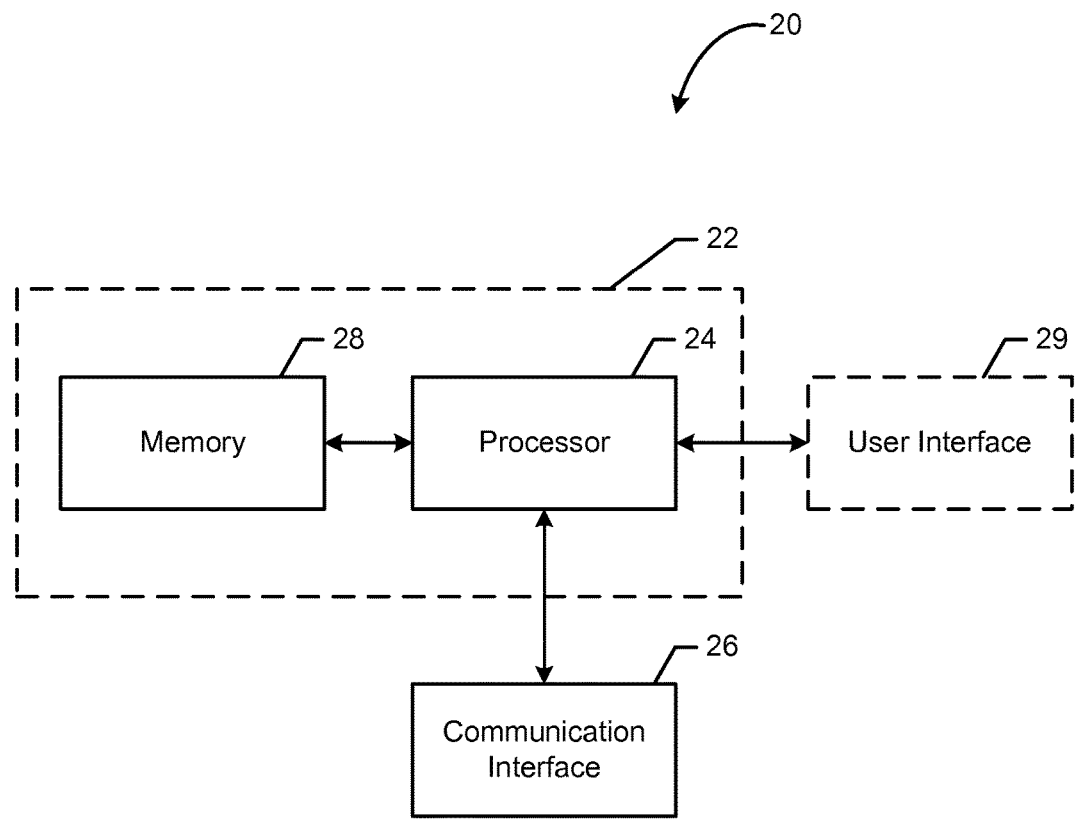
Figures 3A, 3B:
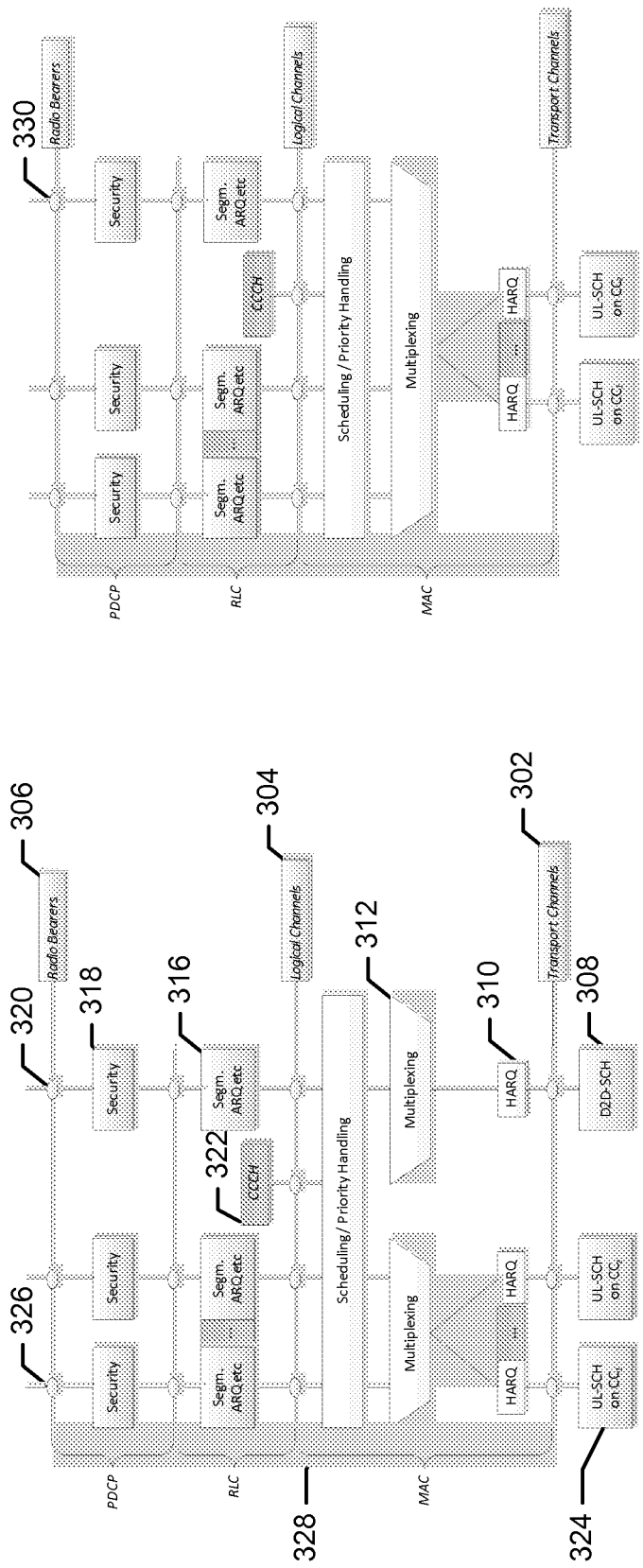
Figure 4A:
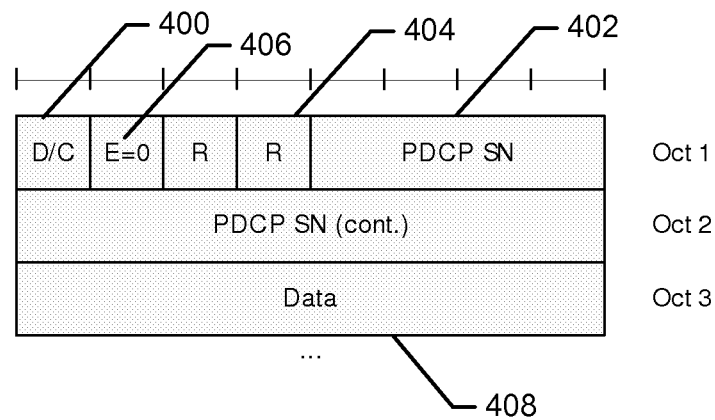
Figure 4B:
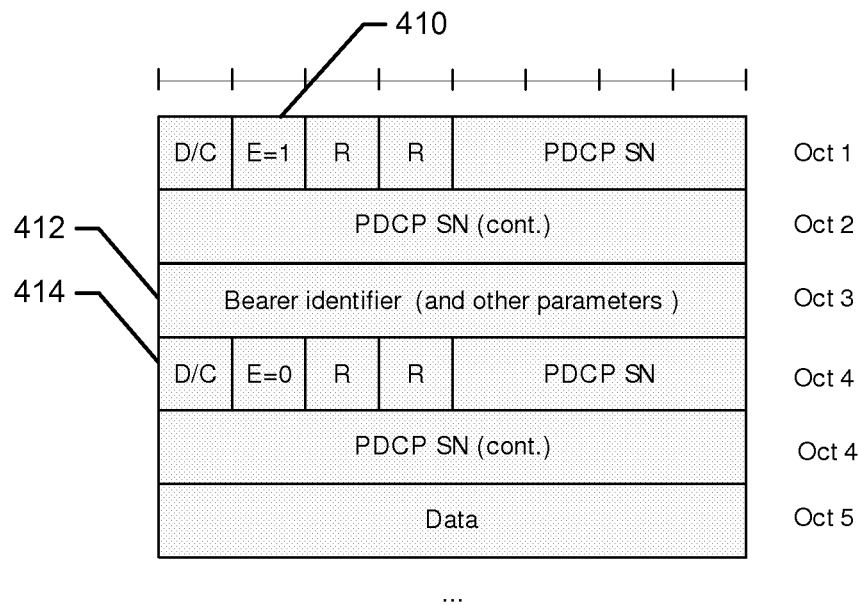
Figure 5:
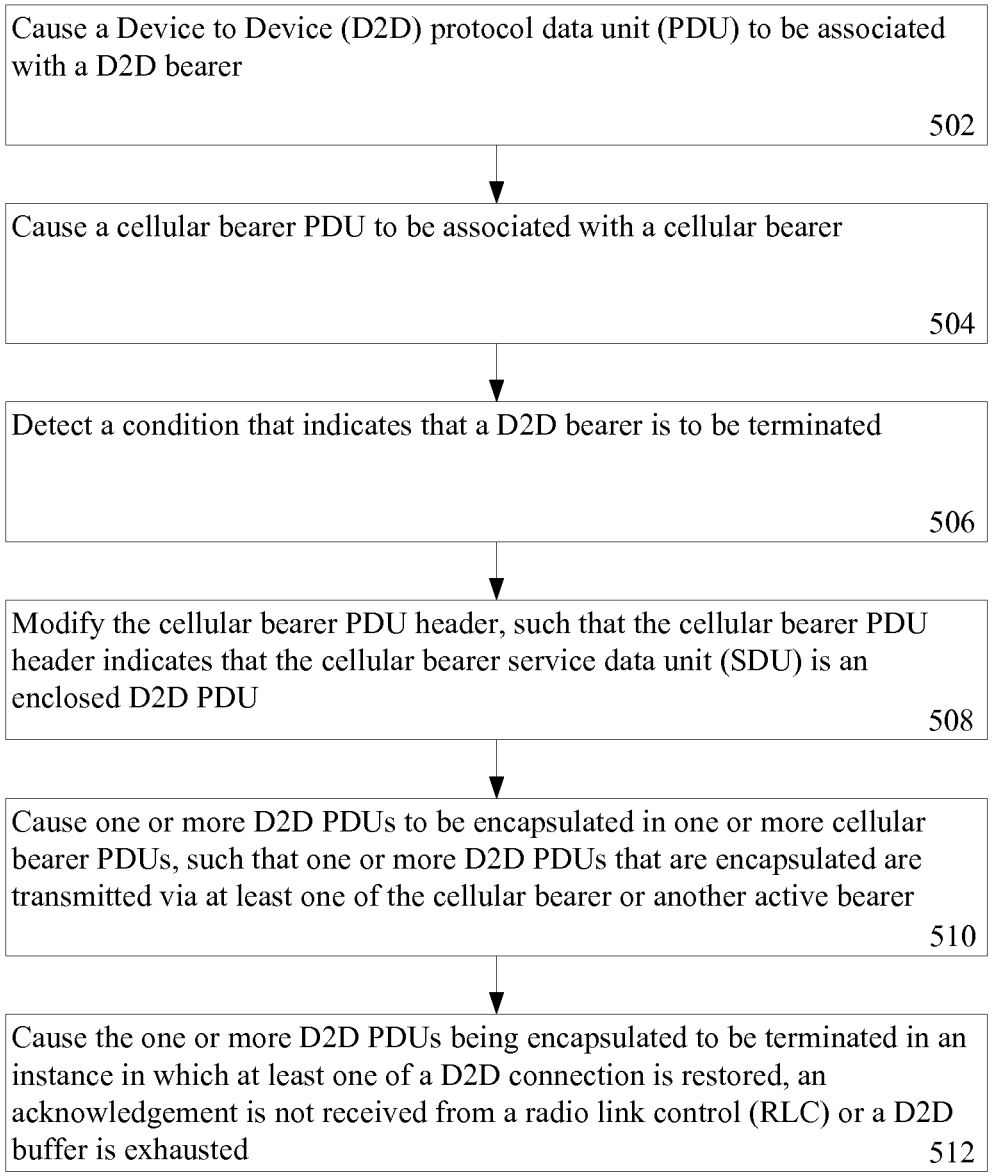
Figure 6:
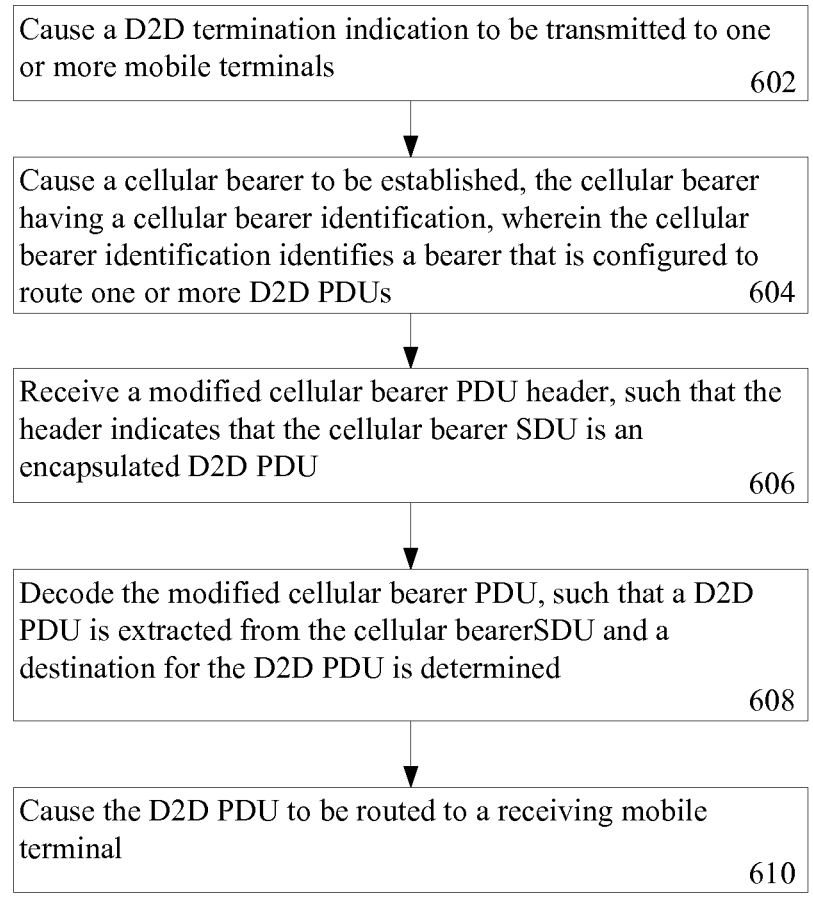
Figure 7:
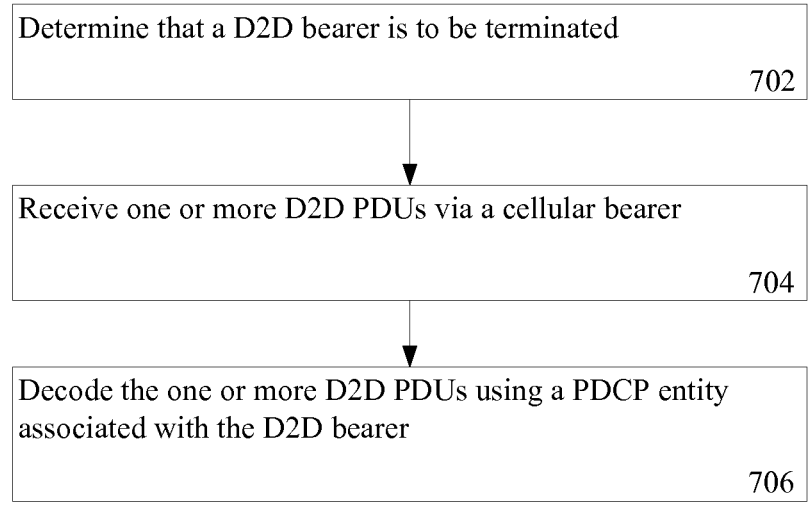

Having thus described the example embodiments of the invention in general terms, reference will now be made to the accompanying drawings, which are not necessarily drawn to scale, and wherein:

FIG. 1 is a schematic representation of a system having a mobile terminal that may benefit from some example embodiments of the present invention;

FIG. 2 is a block diagram of an apparatus that may be embodied by a mobile terminal and/or a base station in accordance with some example embodiments of the present invention;

FIGS. 3a and 3b illustrate various examples of a mobile terminal radio stack in accordance with some example embodiments of the present invention;

FIGS. 4a and 4b illustrate various examples of protocol data units in accordance with some example embodiments of the present invention;

FIG. 5 is a flowchart illustrating operations performed by an example transmitting mobile terminal in accordance with some example embodiments of the present invention;

FIG. 6 is a flowchart illustrating operations performed by an example base station in accordance with some example embodiments of the present invention;

FIG. 7 is a flowchart illustrating operations performed by an example receiving mobile terminal in accordance with some example embodiments of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

In some examples, a D2D connection is a direct connection formed between a first mobile terminal and a second mobile terminal over the cellular radio spectrum. The D2D connection is a local communication link and is enabled for use over short distances. As such, in some cases, a D2D connection between mobile terminals could fail very suddenly as a mobile terminal moves out of D2D communications range. In some examples, a D2D connection is occasionally broken due to the fact that a mobile terminal is at a D2D connection edge and therefore may periodically lose its D2D connection. Because the D2D connection could be lost quite rapidly, handover (e.g. bearer establishment) of the D2D communications to traditional cellular communications (e.g. Evolved Universal Mobile Telecommunications System Terrestrial Radio Access Network (E-UTRAN)) may not occur in time to synchronize the multiple mobile terminals. As a result, multiple protocol data units between the mobile terminals may be lost.

A method, apparatus and computer program product are provided herein for enabling a D2D bearer to stay alive even in an instance in which a D2D connection is lost. As such and as is described herein, in order to preserve D2D communications via the D2D bearer, the D2D protocol data units (PDU) may, for example, be tunneled via a base station to a receiving mobile terminal. In some example embodiments, a D2D PDU may be encapsulated within a PDU (e.g. as a service data unit (SDU)) that is to be transmitted (e.g. packet tunneling) to a base station via using any cellular logical channel and radio bearer (e.g. an evolved packet system). The base station may then decode the PDU and determine that the D2D PDU is directed to another connected mobile terminal. As such, the D2D PDU is transmitted to the receiving mobile terminal. The receiving mobile terminal may then process the received D2D PDU as if it had been received via the D2D connection. Thereby, for example, preserving, at least temporarily, the D2D connection.

Such a process (e.g. packet tunneling) may continue until handover of the D2D connection to traditional cellular communications, via a cellular network, is completed or until a D2D connection is restored. Quick back-and-forth handovers between the D2D connection and the tunneled link, for example, enables uninterrupted communications between mobile terminals even if the D2D connection fails periodically. As such and as described herein, the D2D connection is kept logically alive even in instance in which the D2D connection may be physically broken.

Although the method, apparatus and computer program product as described herein may be implemented in a variety of different systems, one example of such a system is shown in FIG. 1, which includes a mobile terminal (e.g., mobile terminal 10 and/or mobile terminal 12) that is capable of communication via a base station 14, such as an access point, a macro cell, a Node B, an eNB, Base Transceiver Station (BTS), a coordination unit, a macro base station or other base station, with a network 16 (e.g., a core network). While the network may be configured in accordance with Global System for Mobile Communications (GSM), other networks, such as LTE™ or LTE-Advanced (LTE-A™), may support the method, apparatus and computer program product of some embodiments of the present invention including those configured in accordance with wideband code division multiple access (W-CDMA™), CDMA2000, general packet radio service (GPRS™), IEEE™ 802.11 standard for wireless fidelity (WiFi), wireless local access network (WLAN™) Worldwide Interoperability for Microwave Access (WiMAX™) protocols, and/or the like.

The network 16 may include a collection of various different nodes, devices or functions that may be in communication with each other via corresponding wired and/or wireless interfaces. For example, the network 16 may include one or more cells, including base station 14, which may serve a respective coverage area. The base station 14 may be, for example, part of one or more cellular or mobile networks or public land mobile networks (PLMNs). In turn, other devices such as processing devices (e.g., personal computers, server computers or the like) may be coupled to the mobile terminal 10, mobile terminal 12 and/or other communication devices via the network 16.

A mobile terminal, such as the mobile terminal 10 and/or mobile terminal 12 (also known as user equipment (UE), a communications device or the like), may be in communication with other mobile terminals or other devices via the base station 14 and, in turn, the network 16. In some cases, the mobile terminal 10 may include an antenna or a plurality of antennas for transmitting signals to and for receiving signals from a base station 14. Mobile terminal 10 and/or mobile terminal 12 are further configured for direct communications (e.g. D2D communications) via link 18.

In some example embodiments, the mobile terminal 10 and/or mobile terminal 12 may be a mobile communication device such as, for example, a mobile telephone, portable digital assistant (PDA), pager, laptop computer, STA, a tablet, or any of numerous other hand held or portable communication devices, computation devices, content generation devices, content consumption devices, or combinations thereof. Other such devices that are configured to connect to the network include, but are not limited to a refrigerator, a security system, a home lighting system, and/or the like. As such, the mobile terminal 10 and/or mobile terminal 12 may include one or more processors that may define processing circuitry and a processing system, either alone or in combination with one or more memories. The processing circuitry may utilize instructions stored in the memory to cause the mobile terminal 10 and/or mobile terminal 12 to operate in a particular way or execute specific functionality when the instructions are executed by the one or more processors. The mobile terminal 10 and/or mobile terminal 12 may also include communication circuitry and corresponding hardware/software to enable communication with other devices and/or the network 16.

In some example embodiments, the mobile terminal 10, the mobile terminal 12 and/or the base station 14 may be embodied as or otherwise include an apparatus 20 as generically represented by the block diagram of FIG. 2. While the apparatus 20 may be employed, for example, by a mobile terminal 10, mobile terminal 12 or a base station 14, it should be noted that the components, devices or elements described below may not be mandatory and thus some may be omitted in certain embodiments. Additionally, some embodiments may include further or different components, devices or elements beyond those shown and described herein.

As shown in FIG. 2, the apparatus 20 may include or otherwise be in communication with processing circuitry 22 that is configurable to perform actions in accordance with example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 22 may include a processor 24 and memory 28 that may be in communication with or otherwise control a communication interface 26 and, in some cases, a user interface 29. As such, the processing circuitry may be embodied as a circuit chip (e.g., an integrated circuit chip) configured (e.g., with hardware, software or a combination of hardware and software) to perform operations described herein. However, in some embodiments taken in the context of the mobile terminal 10, the processing circuitry may be embodied as a portion of a mobile computing device or other mobile terminal. In some examples, the processing circuitry 22 and/or the processor 24 make take the form of a processing system in some example embodiments.

The user interface 29 (if implemented) may be in communication with the processing circuitry 22 to receive an indication of a user input at the user interface and/or to provide an audible, visual, mechanical or other output to the user. As such, the user interface may include, for example, a keyboard, a mouse, a trackball, a display, a touch screen, a microphone, a speaker, and/or other input/output mechanisms. The apparatus 20 need not always include a user interface. For example, in instances in which the apparatus is embodied as a base station 14, the apparatus may not include a user interface. As such, the user interface is shown in dashed lines in FIG. 2.

The communication interface 26 may include one or more interface mechanisms for enabling communication with other devices and/or networks. In some cases, the communication interface may be any means such as a device or circuitry embodied in either hardware, or a combination of hardware and software that is configured to receive and/or transmit data from/to a network 16 and/or any other device or module in communication with the processing circuitry 22, such as between the mobile terminal 10, mobile terminal 12 and the base station 14. In this regard, the communication interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

In an example embodiment, the memory 28 may include one or more non-transitory memory devices such as, for example, volatile and/or non-volatile memory that may be either fixed or removable. The memory may be configured to store information, data, applications, instructions or the like for enabling the apparatus 20 to carry out various functions in accordance with example embodiments of the present invention. For example, the memory could be configured to buffer input data for processing by the processor 24. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 24 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 28 or otherwise accessible to the processor. As such, whether configured by hardware or by a combination of hardware and software, the processor may represent an entity (e.g., physically embodied in circuitry—in the form of processing circuitry 22) capable of performing operations according to embodiments of the present invention while configured accordingly. Thus, for example, when the processor is embodied as an ASIC, FPGA or the like, the processor 24 may be specifically configured hardware for conducting the operations described herein. Alternatively, as another example, when the processor 24 is embodied as an executor of software instructions, the instructions may specifically configure the processor 24 to perform the operations described herein.

FIGS. 3a and 3b illustrate various examples of a mobile terminal radio stack in accordance with some example embodiments of the present invention. In some examples and in an instance in which there is a physical D2D connection, a D2D single channel 308 may be configured on the transport channel layer 302 and one or more radio bearers 306, such as a D2D bearer 320, may be established. As is shown in FIG. 3a, multiple cellular bearers may also be established, such as cellular bearer 326. Each of D2D bearer 320 and cellular bearer 326 may communicate via logical channels 304.

The example mobile terminal radio stack for D2D single channel 308 and/or one cellular uplink single channel 324, shown with reference to FIGS. 3a and 3b, illustrates a medium access control layer (MAC), a radio link control (RLC) layer and a packet data convergence protocol (PDCP) layer. The MAC layer includes transport channels 302, a hybrid automatic repeat request (HARM) entity 310, a multiplexing entity 312 and scheduling/priority handling

328. The RLC layer comprises an RLC entity that provides automatic repeat request (ARQ) functionality 316 and supports data segmentation and concatenation. The RLC layer further comprises the common control channel (CCCH) 322. The PDCP layer comprises a PDCP entity that is configured to perform a security function 318, such as encoding and decoding of the user plane and control plane data.

In some examples, a mobile terminal, such as mobile terminal 10 and/or mobile terminal 12, may receive an indication or otherwise determine that a D2D connection, such as link 18, is to be terminated or will otherwise fail. In some cases, the indication of the termination may take the form of a message or other notification that is received from a base station, such as base station 14, another mobile terminal, the network, such as network 16, and/or the like. In other example embodiments, the mobile terminal may determine that the D2D connection is to be terminated based on a connection status, a quality of service measure and/or the like. In some example embodiments, a handover decision may cause the determination that the D2D connection is to be terminated.

Alternatively or additionally, a base station may indicate that the D2D connection is to be terminated. In such cases, the base station may then configure or otherwise cause a bearer to be established for the purposes of tunneling, such as example PDCP tunneling. In some examples, the configuration may include one or more instructions that cause the mobile terminals to perform PDCP tunneling as is described herein.

In some example embodiments and in an instance in which a D2D connection is determinated to be terminated or has already been terminated, the mobile terminal, such as via the processing circuitry 22, the processor 24 or the like, may enable PDCP tunneling by causing one or more D2D PDCP PDUs that are currently associated (e.g. stored in a buffer to be transmitted) with a D2D bearer to be enclosed or otherwise encapsulated inside a cellular bearer PDCP PDU that is associated with and is to be transported via a cellular bearer, such as an EPS bearer. In addition, the header of the cellular bearer PDCP PDU is modified, such as by the processing circuitry 22, the processor 24 or the like, so that the header indicates that the cellular bearer PDCP SDU contains an enclosed PDU, such as a D2D PDCP PDU. Enclosing or encapsulating the D2D PDCP PDU enables the D2D PDCP PDU to be transmitted using the cellular bearer via the base station to a receiving mobile terminal.

In some examples, a new bearer may be established for the purposes of enclosing or encapsulating the D2D PDCP PDU as the SDU of a cellular bearer PDCP PDU, such as bearer 330 in FIG. 3*b*. A new bearer may be established instead of selecting an existing bearer based on one or more channel indications, such as a quality of service indication. In some examples, the new bearer may be a dedicated bearer, in some example embodiments, for the purposes of encapsulating the D2D PDCP PDUs. As such, advantageously the D2D bearer may be maintained (e.g. the logical connection) even without an active D2D connection on the physical layer in some examples.

In an instance in which a D2D PDCP PDU is enclosed or encapsulated inside another cellular bearer PDCP PDU and in some example embodiments, a payload of the PDCP PDU may not be encrypted or may not otherwise be integrity protected because the D2D PDCP PDU is encrypted or otherwise integrity protected. In some example embodiments, the D2D PDCP PDU is to be encrypted and integrity protected according to the security settings of the D2D bearer associated with the D2D PDCP PDU. Advantageously, for example, by not encrypting the cellular bearer PDCP PDU, the cellular bearer PDCP PDU can be routed more quickly, in some cases, than if it was encrypted. Alternatively or additionally, the cellular bearer PDCP PDU may be encrypted and integrity protected in some example embodiments, while in other embodiments, the D2D PDCP PDU is not encrypted.

The existence of the D2D physical connection may be managed with a suitable timer which may be configured by the mobile terminal, the base station or by the network. The timer, in some example embodiments, may be started and restarted each time the physical D2D connection is operational. The D2D may be kept logically alive as long as the timer is running. In an instance in which the timer expires, the logical D2D connection may be also logically disconnected and the D2D packets may be permanently reconfigured to be routed via conventional cellular bearers.

FIGS. 4*a* and 4*b* illustrate various examples of PDUs in accordance with some example embodiments of the present invention. In some examples, a PDCP PDU and its bearer identifier that is enclosed inside another PDCP PDU may be signaled to a base station, a receiving mobile terminal or the like via the PDCP PDU header. FIG. 4*a* illustrates the format of a PDCP PDU and the PDCP PDU header. The PDCP PDU header, for example, includes a 1-bit identifier to distinguish between a PDCP Data PDU and a PDCP Control PDU (D/C) 400, a sequence number (SN) 402, one or more reserved bits (R) 404, an enclosed indicator bit (E) 406 and an SDU 408. In some example embodiments, the enclosed bit 406 indicates the presence of an enclosed or otherwise encapsulated bit within the PDU. For example, an enclosed bit 406 with a value "0" may indicate that there is no enclosed PDU, whereas a value of "1" indicates that there is another PDU enclosed.

FIG. 4*b* illustrates a PDCP PDU having an enclosed or encapsulated D2D PDCP PDU. As is shown in FIG. 4*b*, the PDCP PDU header includes an enclosed bit 410 having an example value of "1", which as described above, indicates, in some example embodiments, the presence of an enclosed or encapsulated SDU 410. An identifier 412 may also be included in the PDCP PDU header. The identifier is configured to identify that the SDU 414 contains a D2D PDCP PDU to the base station or other receiving entity.

FIGS. 5-7 illustrate example operations performed by a method, apparatus and computer program product, such as apparatus 20 of FIG. 2 in accordance with one embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described herein may be embodied by computer program instructions. In this regard, the computer program instructions which embody the procedures described herein may be stored by a memory 28 of an apparatus employing an embodiment of the present invention and executed by a processor 24 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 5-7, when executed, convert a computer or processing circuitry into a particular machine configured to perform an example embodiment of the present invention. Accordingly, the operations of FIGS. 5-7 define an algorithm for configuring a computer or processing circuitry 22, e.g., processing system, to perform an example embodiment. In some cases, a general purpose computer may be provided with an instance of the processor which performs the algorithm of FIGS. 5-7 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations herein may be modified or further amplified as described below. Moreover, in some embodiments additional optional operations may also be included. It should be appreciated that each of the modifications, optional additions or amplifications below may be included with the operations herein either alone or in combination with any others among the features described herein.

FIG. 5 is a flowchart illustrating operations performed by an example transmitting mobile terminal, such as mobile terminal 10 and/or mobile terminal 12, or a component of a transmitting mobile terminal, such as the processing circuitry 22, the processor 24, the communications interface 26, a modem and/or the like, in accordance with some example embodiments of the present invention. As is shown with respect to operation 502, the apparatus 20 embodied, for example by mobile terminal 10 and/or mobile terminal 12, may include means, such as the processing circuitry 22, the processor 24 or the like, for causing a D2D PDU to be associated with a D2D in an instance in which a D2D connection is created and is operational. As is shown with respect to operation 504, the apparatus 20 embodied, for example by mobile terminal 10 and/or mobile terminal 12, may include means, such as the processing circuitry 22, the processor 24 or the like, for causing a cellular bearer PDU, such as a cellular bearer PDU, to be associated with a cellular bearer, such as an EPS bearer, in an instance in which a cellular link is created and is operational.

As is shown with respect to operation 506, the apparatus 20 embodied, for example by mobile terminal 10 and/or mobile terminal 12, may include means, such as the processing circuitry 22, the processor 24, the communication interface 26 or the like, for detecting a condition that indicates that a D2D bearer is to be terminated and/or is already terminated. In such cases, tunneling may be activated by the processing circuitry 22, the processor 24, the communication interface 26 or the like. The tunneling (e.g. PDCP tunneling) is further described with respect to operations 508-512.

As is shown with respect to operation 508, the apparatus 20 embodied, for example by mobile terminal 10 and/or mobile terminal 12, may include means, such as the processing circuitry 22, the processor 24, the communication interface 26 or the like, for modifying the cellular bearer PDU header, such that the header indicates that the cellular bearer SDU is an enclosed D2D PDU. As is shown with respect to operation 510, the apparatus 20 embodied, for example by mobile terminal 10 and/or mobile terminal 12, may include means, such as the processing circuitry 22, the processor 24, the communication interface 26 or the like, for causing the one or more D2D PDUs to be encapsulated in one or more cellular bearer PDUs, such that one or more D2D PDUs that are encapsulated are transmitted via at least one of the cellular bearer, such as an EPS bearer, or another active bearer. As such, the D2D connection may be maintained via the EPS bearer and, for example, packets in a buffer intended to be transmitted via the D2D connection are transmitted via the EPS bearer.

In some example embodiments, the one or more cellular bearer PDUs are configured to be decoded at a base station to extract the one or more D2D PDUs so that they may be routed to a receiving mobile terminal. The one or more device-to-device protocol data units being encapsulated within one or more packet data convergence protocol protocol data units are then such that they can to be decoded via the device-to-device connection at the receiving mobile terminal As is shown with respect to operation 512, the apparatus 20 embodied, for example by mobile terminal 10 and/or mobile terminal 12, may include means, such as the processing circuitry 22, the processor 24, the communication interface 26 or the like, for causing the one or more D2D PDUs being encapsulated to be terminated in an instance in which at least one of a D2D connection is restored, an acknowledgement is not received from a radio link control (RLC) or a D2D buffer is exhausted. In some examples, a discard timer may be configured to discard any D2D PDUs (e.g. PDUs in a buffer) that are not transmitted prior to the expiration of the timer. In some example embodiments, a cellular bearer PDU is a cellular bearer PDCP PDU and a D2D PDU is a D2D PDCP PDU.

FIG. 6 is a flowchart illustrating operations performed by an example base station in accordance with some example embodiments of the present invention. As is shown with respect to operation 602, the apparatus 20 embodied, for example by base station 14, may include means, such as the processing circuitry 22, the processor 24, the communication interface 26 or the like, for causing a D2D termination indication to be transmitted to one or more mobile terminals. Alternatively or additionally, the D2D termination indication may be received from one or more mobile terminals. As is shown with respect to operation 604, the apparatus 20 embodied, for example by base station 14, may include means, such as the processing circuitry 22, the processor 24, the communication interface 26 or the like, for causing an EPS bearer to be established, the EPS bearer having an EPS bearer identification, wherein the EPS identification identifies a bearer that is configured to route one or more D2D PDUs.

As is shown with respect to operation 606, the apparatus 20 embodied, for example by base station 14, may include means, such as the processing circuitry 22, the processor 24, the communication interface 26 or the like, for receiving a modified cellular bearer PDU header, such that the header indicates that the cellular bearer SDU is an encapsulated D2D PDU. As is shown with respect to operation 608, the apparatus 20 embodied, for example by base station 14, may include means, such as the processing circuitry 22, the processor 24 or the like, for decoding the modified cellular bearer PDU, such that a D2D PDU is extracted from the cellular bearer SDU and a destination for the D2D PDU is determined. As is shown with respect to operation 610, the apparatus 20 embodied, for example by base station 14, may include means, such as the processing circuitry 22, the processor 24, the communication interface 26 or the like, for causing the D2D PDU to be routed to a receiving mobile terminal. The D2D PDU may be routed to the receiving mobile terminal by being encapsulated in a cellular bearer PDU.

FIG. 7 is a flowchart illustrating operations performed by an example receiving mobile terminal, such as mobile terminal 10 and/or mobile terminal 12, or a component of a receiving mobile terminal, such as the processing circuitry 22, the processor 24, the communications interface 26, a modem and/or the like, in accordance with some example embodiments of the present invention. As is shown with respect to operation 702, the apparatus 20 embodied, for example by mobile terminal 10 and/or mobile terminal 12, may include means, such as the processing circuitry 22, the processor 24, the communications interface 26 or the like, for determining that a D2D bearer is to be terminated. As is shown with respect to operation 704, the apparatus 20 embodied, for example by mobile terminal 10 and/or mobile terminal 12, may include means, such as the processing circuitry 22, the processor 24, the communications interface 26 or the like, for receiving one or more D2D PDUs via a cellular bearer. As is shown with respect to operation 706, the apparatus 20 embodied, for example by mobile terminal 10 and/or mobile terminal 12, may include means, such as the processing circuitry 22, the processor 24, or the like, for decoding the one or more D2D PDUs using an entity, such as an example PDCP entity, associated with the D2D bearer. It will be appreciated that the one or more D2D PDUs may be decoded such that they are extracted from one or more cellular bearer PDUs. Once, decoded, the D2D PDUs are processed, for example, using the lower layers of the radio stack established for the D2D bearer.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method comprising:

detecting a condition that indicates that a device-to-device bearer is to be terminated;

modifying a cellular bearer protocol data unit header, such that the cellular bearer protocol data unit header indicates that a cellular bearer service data unit is a device-to-device protocol data unit; and causing one or more device-to-device protocol data units to be encapsulated within one or more cellular bearer protocol data units, such that the one or more device-to-device protocol data units are transmitted via a cellular bearer.

2. A method according to claim 1, further comprising:

causing the one or more device-to-device protocol data units to be associated with the device-to-device bearer, wherein the one or more device-to-device protocol data units are transmitted via the device-to-device bearer; and causing the one or more cellular bearer protocol data units to be associated with the cellular bearer, wherein the one or more cellular bearer protocol data units are transmitted via the cellular bearer.

3. A method according to claim 1, wherein the one or more cellular bearer protocol data units are configured to be decoded at a base station such that, the one or more device-to-device protocol data units may be removed from the one or more cellular bearer protocol data units and routed to a receiving mobile terminal.

4. A method according to claim 3, wherein the one or more device-to-device protocol data units encapsulated within the one or more cellular bearer protocol data units are configured to be decoded by a packet data convergence protocol entity associated with the device-to-device bearer at the receiving mobile terminal.

5. A method according to claim 1, wherein the cellular bearer protocol data unit header is configured to provide routing information for the one or more device-to-device protocol data units.

6. A method according to claim 1, further comprising:

causing the one or more device-to-device protocol data units encapsulated within the one or more cellular bearer protocol data units to be terminated in an instance in which at least one of a device-to-device connection is restored, an acknowledgement is not received from a radio link control or a device-to-device buffer is exhausted.

7. A method according to claim 1, wherein the condition that indicates that the device-to-device bearer is to be terminated is received from a base station via a handover notification or is based on a determination that a quality of service of the device-to-device bearer is below a predetermined threshold.

8. A method according to claim 1, wherein the one or more cellular bearer protocol data units are cellular bearer packet data convergence protocol protocol data units and the one or more device-to-device protocol data units are device-to-device bearer packet data convergence protocol protocol data units.

9. A computer program product comprising a set of instructions, which, when executed by a computing device, causes the computing device to implement the method of claim 1.

10. An apparatus comprising:
a processing system arranged to cause the apparatus to at least:
detect a condition that indicates that a device-to-device bearer is to be terminated;
modify a cellular bearer protocol data unit header, such that the cellular bearer protocol data unit header indicates that a cellular bearer service data unit is a device-to-device protocol data unit; and
cause one or more device-to-device protocol data units to be encapsulated within one or more cellular bearer protocol data units, such that the one or more device-to-device protocol data units are transmitted via a cellular bearer.

11. An apparatus according to claim 10, wherein the processing system is arranged to cause the apparatus to:
cause the one or more device-to-device protocol data units to be associated with the device-to-device bearer, wherein the one or more device-to-device protocol data units are transmitted via the device-to-device bearer; and
cause the one or more cellular bearer protocol data units to be associated with the cellular bearer, wherein the one or more cellular bearer protocol data units are transmitted via the cellular bearer.

12. An apparatus according to claim 10, wherein the one or more cellular bearer protocol data units are configured to be decoded at a base station such that, the one or more device-to-device protocol data units may be removed from the one or more cellular bearer protocol data units and routed to a receiving mobile terminal.

13. An apparatus according to claim 12, wherein the one or more device-to-device protocol data units encapsulated within the one or more cellular bearer protocol data units are configured to be decoded by a packet data convergence protocol entity associated with the device-to-device bearer at the receiving mobile terminal.

14. An apparatus according to claim 10, wherein the cellular bearer protocol data unit header is configured to provide routing information for the one or more device-to-device protocol data units.

15. An apparatus according to claim 10, wherein the processing system is arranged to cause the apparatus to:
cause the one or more device-to-device protocol data units encapsulated within the one or more cellular bearer protocol data units to be terminated in an instance in which at least one of a device-to-device connection is restored, an acknowledgement is not received from a radio link control or a device-to-device buffer is exhausted.

16. An apparatus according to claim 10, wherein the condition that indicates that the device-to-device bearer is to be terminated is received from a base station via a handover notification or is based on a determination that a quality of service of the device-to-device bearer is below a predetermined threshold.

17. An apparatus according to claim 10, wherein the one or more cellular bearer protocol data units are cellular bearer packet data convergence protocol protocol data units and the one or more device-to-device protocol data units are device-to-device bearer packet data convergence protocol protocol data units.

18. An apparatus according to claim 10, wherein a device-to-device connection with a receiving mobile terminal is maintained via the cellular bearer and wherein the cellular bearer is at least one of an evolved packet system bearer and a radio bearer.

19. An apparatus according to claim 10, wherein the processing system is arranged to cause the apparatus to:
cause the device-to-device bearer to be configured according to a discard timer associated with a last cellular bearer service data unit in a buffer of a packet data convergence protocol entity associated with the device-to-device bearer.

20. An apparatus according to claim 10, wherein the apparatus comprises at least one of a user equipment or a communications device and/or wherein the apparatus is configured for use in at least one of global system for mobile communications, wideband code division multiple access, time division synchronous code division multiple access, a long term evolution or long term evolution advanced system.

* * * * *

UNITED STATES PATENT AND TRADEMARK OFFICE
CERTIFICATE OF CORRECTION

PATENT NO. : 9,813,958 B2
APPLICATION NO. : 14/439488
DATED : November 7, 2017
INVENTOR(S) : Jukka Ranta et al.

Page 1 of 1

It is certified that error appears in the above-identified patent and that said Letters Patent is hereby corrected as shown below:

In the Claims

Column 14, Line 60, change "protocol protocol" to --protocol--;
Line 62, change "protocol protocol" to --protocol--.

Column 16, Line 17, change "protocol protocol" to --protocol--;
Line 19, change "protocol protocol" to --protocol--.

Signed and Sealed this
Twenty-eighth Day of May, 2019

Andrei Iancu
*Director of the United States Patent and Trademark Office*